United States Patent
Uchida et al.

(10) Patent No.: US 7,044,181 B1
(45) Date of Patent: May 16, 2006

(54) STUDLESS TIRE HAVING TREAD INCLUDING FIBERS ORIENTED IN THICKNESS DIRECTION

(75) Inventors: Mamoru Uchida, Akashi (JP);
Naohiko Kikuchi, Kobe (JP); Narihiro Tahara, Akashi (JP); Takeshi Ohta, Toyonaka (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/627,424

(22) Filed: Jul. 27, 2000

(30) Foreign Application Priority Data

Jul. 27, 1999 (JP) ................................ 11-212129

(51) Int. Cl.
*B60C 1/00* (2006.01)
*B60C 9/12* (2006.01)
*B60C 11/00* (2006.01)

(52) U.S. Cl. .................... 152/209.4; 152/212; 152/458

(58) Field of Classification Search ............. 152/209.4, 152/209.5, 211, 212, 458
See application file for complete search history.

(56) References Cited

U.S. PATENT DOCUMENTS

| | | | |
|---|---|---|---|
| 1,037,311 A * | 9/1912 | Pratt | 152/212 |
| 1,935,519 A * | 11/1933 | Quinn | 152/212 |
| 5,591,279 A | 1/1997 | Midorikawa et al. | |
| 5,702,546 A * | 12/1997 | Itoh et al. | 152/209.4 |
| 5,967,211 A * | 10/1999 | Lucas et al. | 152/209.4 |
| 5,975,173 A * | 11/1999 | Izumoto et al. | 152/209.4 |
| 6,374,885 B1 * | 4/2002 | Uchida et al. | 152/209.4 |
| 2001/0004911 A1 * | 6/2001 | Iwamura | |

FOREIGN PATENT DOCUMENTS

| | | | |
|---|---|---|---|
| CA | 2049784 | * | 3/1992 |
| DE | 3122792 | * | 12/1982 |
| EP | 1006007 | * | 6/2000 |
| FR | 400962 | * | 8/1909 |
| GB | 1462683 | | 1/1977 |
| JP | 62-191204 | * | 8/1987 |
| JP | 2274602 | | 11/1990 |
| JP | 3-258603 | * | 11/1991 |
| JP | 4110211 | | 4/1992 |
| JP | 7-61209 | * | 3/1995 |
| JP | 10-129214 | * | 5/1998 |
| WO | WO 98/13185 | * | 4/1998 |

OTHER PUBLICATIONS

Abstract for Japan 10-129214.*
Machine Translation for Japan 10-129214.*
Translation for Japan 62-191204.*
Japan 10-129214, May 19, 1998 (abstract only).
Japan 06-16004, Jan. 25, 1994 (abstract only).

* cited by examiner

*Primary Examiner*—Steven D. Maki
(74) *Attorney, Agent, or Firm*—Birch, Stewart, Kolasch & Birch, LLP

(57) ABSTRACT

There is provided a studless tire that is excellent especially in performance on a snow or ice road. A studless tire, wherein non-metal staple fibers having an average fiber diameter of 1 to 100 μm and an average length of 0.1 to 5 mm are dispersed in a diene rubber in such a way that the non-metal staple fibers are oriented in a thickness direction of a tread, a complex elastic modulus E1 in the thickness direction of the tread and an elastic module E2 in a circumferential direction of the tire measured at 25° C. satisfy the equation $1.1 \leq E1/E2 \leq 4$, and hardness of the tread rubber measured at −10° C. is 45 to 75 degrees.

1 Claim, 3 Drawing Sheets

STUDLESS TIRE HAVING TREAD INCLUDING FIBERS ORIENTED IN THICKNESS DIRECTION

BACKGROUND OF THE INVENTION

The present invention relates to a tire that is excellent especially in performance on snow or ice road.

Conventionally, when driving an automobile on a snow road in winter, safety on snow or ice road was secured by using studded tires having spikes thereon or tire chains mounted around outer periphery of tire. However, road is apt to be worn and damaged by using the studded tires or the tires having tire chains, and they forms dust particles to bring about pollution and cause a great environmental problem. Therefore, to solve the safety problem and the environmental problem, studless tires have been widely used.

As a technique for improving the performance of the studless tire on ice or snow road, Japanese Unexamined Patent Publication No. 4-110211/1992, for example, discloses a technique in order to improve the frictional force on ice road, i.e., to improve adhesive force and frictional force at a low temperature. The method is a method that non-metal staple fibers such as cellulose staple fibers are mixed with a rubber compound which is excellent in low temperature characteristics, i.e., flexible even at a low temperature, and rigidity at a tire block is controlled by an elasticity difference of the rubber at a block surface, a wall surface portion and an inside portion of the tire generated by orientation of the staple fiber along a block portion surface of a tread portion, and thereby attempting to improve the adhesion force and the friction force to the road surface. However, if the staple fibers are mixed with the tread rubber and a tire is formed by extrusion, the mixed staple fibers are oriented along the machine direction, i.e., along a circumferential direction of the tire. And if the composition is molded and vulcanized into a tire, the most staple fibers of a tread rubber contacted to road surface are oriented in the circumferential direction of the tire, which reinforces and hardens the rubber surface to lower the adhesion of the tire on the contrary when the tire is contacted with an uneven spot on the road.

Since most of the staple fibers are oriented in the circumferential direction of the tire, there are problems that effect for digging and scratching friction is not sufficient. And abrasion resistance becomes low, if further staple fibers are mixed.

Japanese Unexamined Patent Publication No. 2-274602/1990 discloses a studless tire and a method for preparing the same, in which powders having relatively large particles or staple fibers are oriented not in the circumferential direction of the tread but in the thickness direction. This is a technique for improving digging friction by scratching the ice and snow road surface with the particles and the staple fibers, but it is necessary to protrude the staple fibers and particles from the tread rubber surface for the digging effect. Steel staple fibers are used in a disclosed example. But if hard staple fibers such as metal are mixed, the rubber is hardened, abrasion resistance between the rubber and the metal is largely different, and contact area is lowered by disturbing contact of the rubber with road surface according to the protruded metal staple fibers to reduce adhesion force and friction force, and thereby the performance on ice and snow road is deteriorated.

As described above, there exists no tire, which improves or balances adhesion, adhesion friction, digging friction, scratching friction and abrasion resistance, and has excellent performance on ice and snow road.

The present invention has been carried out for solving these problems.

SUMMARY OF THE INVENTION

Namely, the present invention relates to a studless tire, wherein non-metal staple fibers having an average fiber diameter of 1 to 100 µm and an average length of 0.1 to 5 mm are dispersed in a diene rubber in such a way that the non-metal staple fibers are oriented in a thickness direction of tread, a complex elastic modulus E1 in the thickness direction of the tread and an elastic module E2 in a circumferential direction of the tire measured at 25° C. satisfy the equation $1.1 \leq E1/E2 \leq 4$, and hardness of the tread rubber measured at −10° C. is 45 to 75 degrees.

In the above-mentioned studless tire, the non-metal staple fibers are preferably non-metal inorganic staple fibers.

In the above-mentioned studless tire, the non-metal inorganic staple fibers are preferably glass fibers or carbon fibers.

BRIEF DESCRIPTION OF THE DRAWINGS

In FIGS. 1(*a*) and (*b*), 1, 2 and A show tire tread, fiber and orientation direction, respectively.

DETAILED DESCRIPTION

Figure 1:
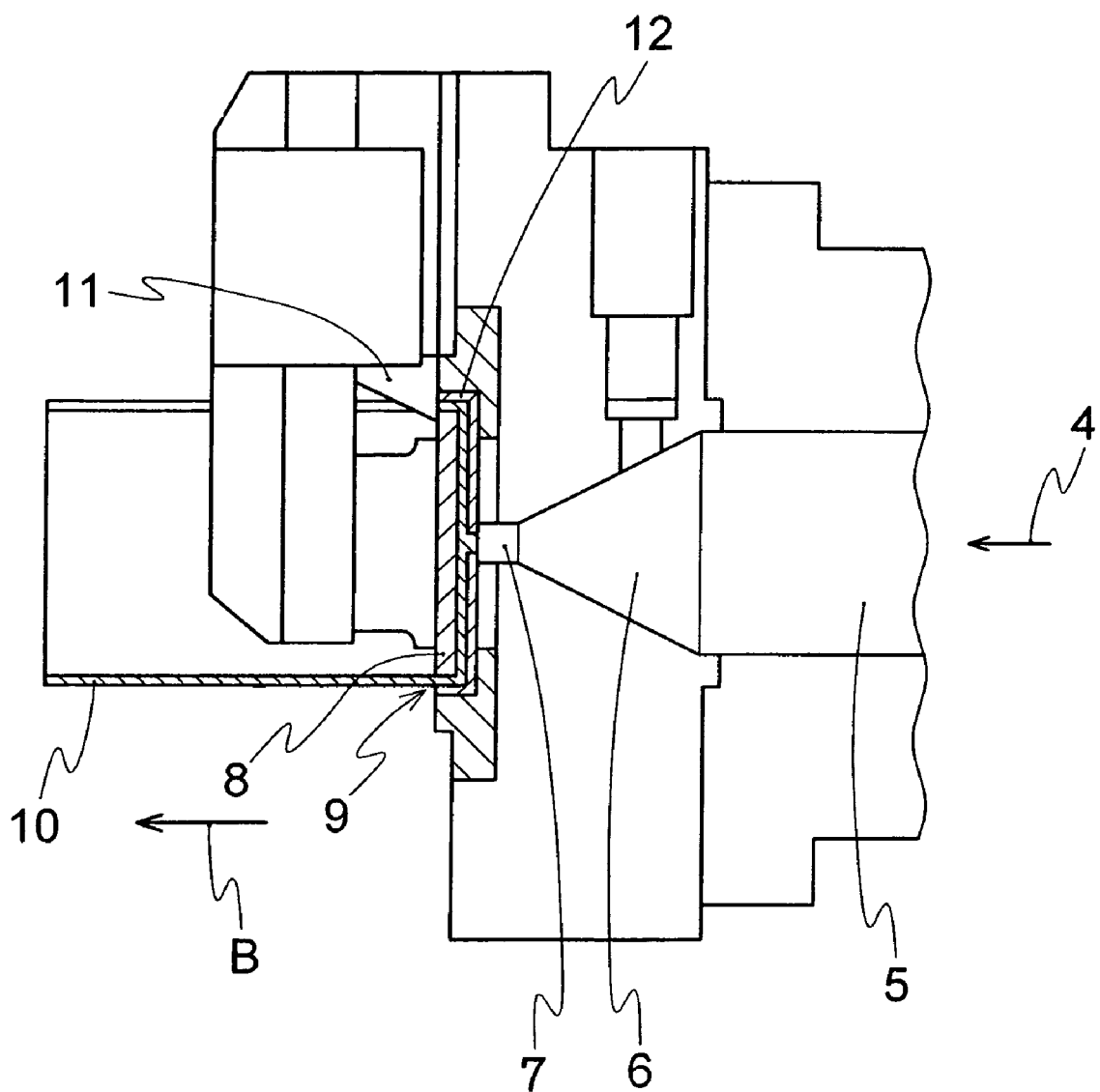
FIG. 1(*a*) is a cross sectional view of tire tread in which fibers are oriented in the circumferential direction and FIG. 1(*b*) is a cross sectional view of tire tread in which fibers are oriented in the tread thickness direction.

By orienting the non-metal staple fibers in the thickness direction of the tire tread, adhesion, adhesion friction, digging friction and scratching friction between tire and road surface are improved or balanced. And thereby it becomes possible to largely improve the performance on ice and snow road.

By orienting the non-metal staple fibers in the thickness direction of the tread, there becomes no influence on orientation direction of the staple fibers on the surface of the tire tread rubber. Flexibility for following the uneven road surface is kept to improve adhesion and adhesion friction. On the tire surface, portions locally having high contact pressure are formed by the non-metal staple fibers oriented in the thickness direction. With these portions, for example, water film generated between frozen road surface and tire surface at tire spinning is pushed away, adhesion and adhesion friction are improved, and digging and scratching friction are also improved at the same time.

In the present invention, there is provided a pneumatic tire especially excellent in running performance on ice and snow road, in which adhesion, adhesion friction and digging friction are improved by blending a tread rubber with staple fibers having specific kind and shape, and specifying a ratio of the elastic modulus in the thickness direction to the elastic modulus in the circumferential direction of the tire made of the tread rubber.

A diameter of the staple fibers to be mixed is preferably 1 to 100 µm, and more preferably 3 to 50 µm. If the diameter of the staple fibers is smaller than 1 µm, staple fibers oriented in the thickness direction of the tread can not sufficiently form the portion having high contact pressure on the tread surface, since an area of the staple fibers is small. On the other hand, if the diameter of the staple fibers is more than 100 µm, adhesion and adhesion friction do not sufficiently work, since force for pushing away the water film between frozen road surface and tire tread surface is inferior.

A length of the staple fibers is preferably 0.1 to 5 mm, and more preferably 0.1 to 3 mm. If the length of the staple fibers is shorter than 0.1 mm, the staple fibers are apt to be dropped from the tread surface during running, and the effect for pushing away the water film is deteriorated. On the other hand, if the length is longer than 5 mm, it becomes difficult to disperse and orient the staple fibers, and workability of the rubber is lowered.

Examples of the diene rubber used in the present invention are a natural rubber, an isoprene rubber, a styrene-butadiene rubber, a butadiene rubber, a chloroprene rubber and an acrylonitrile butadiene rubber.

A ratio of the complex elastic modulus E1 in the thickness direction of the tread to the elastic module E2 in a circumferential direction of the tire is preferably 1.1 to 4, and more preferably 1.2 to 3.5. If the ratio is smaller than 1.1, it is not possible to sufficiently form the portion having high contact pressure on the contacting surface. As a result, the effect for removing the water film between the tread surface and the contacting surface becomes low, and adhesion, adhesion friction, scratching fraction and digging friction are not improved. If the E1/E2 is greater than 4, rigidity of the tread block of the tire becomes excessively high, the tread rubber surface can not follow ice and snow road surface, and adhesion and adhesion friction becomes low.

As a material for the staple fibers, non-metal staple fibers is suitable for ensuring contact between the tread and the ice and snow road surface, which do not damage the road surface and have small difference of abrasion speed compared with the rubber. As the non-metal staple fibers, non-metal inorganic staple fibers are preferable. Further, glass fibers or carbon fibers are preferable, which are broken into suitable short length during the process of mixing the rubber from the viewpoint that it is easy to disperse and orient the fibers, and to obtain a rubber having a suitable ratio of the complex elastic modulus.

Tread rubber hardness measured at −10° C. is preferable 45 to 75 degrees, and more preferably 45 to 60 degrees. If the hardness measured at −10° C. is smaller than 45 degrees, the rubber is excessively flexible at a room temperature, and the steering stability on dry road surface, for example, is deteriorated. On the other hand, if the hardness is greater than 75 degrees, the rubber itself becomes excessively hard, contact property between tread rubber surface and ice and snow road surface becomes inferior to lower the running performance on ice and snow road. Here, the tread rubber hardness means hardness in the thickness direction of the tread.

An amount of the non-staple fiber is preferably 2 to 28 parts by weight based on 100 parts by weight of the diene rubber, more preferably 3 to 20 parts by weight. If the amount is smaller than 2 parts by weight, an amount of staple fibers forming the contact pressure on the tread surface becomes small, the effect for removing the water film is not sufficient. On the other hand, if the amount is greater than 28 parts by weight, the tread block rigidity becomes excessively high, and the tread rubber surface can not follow ice and snow road surface to lower adhesion and adhesion friction.

Figure 2:
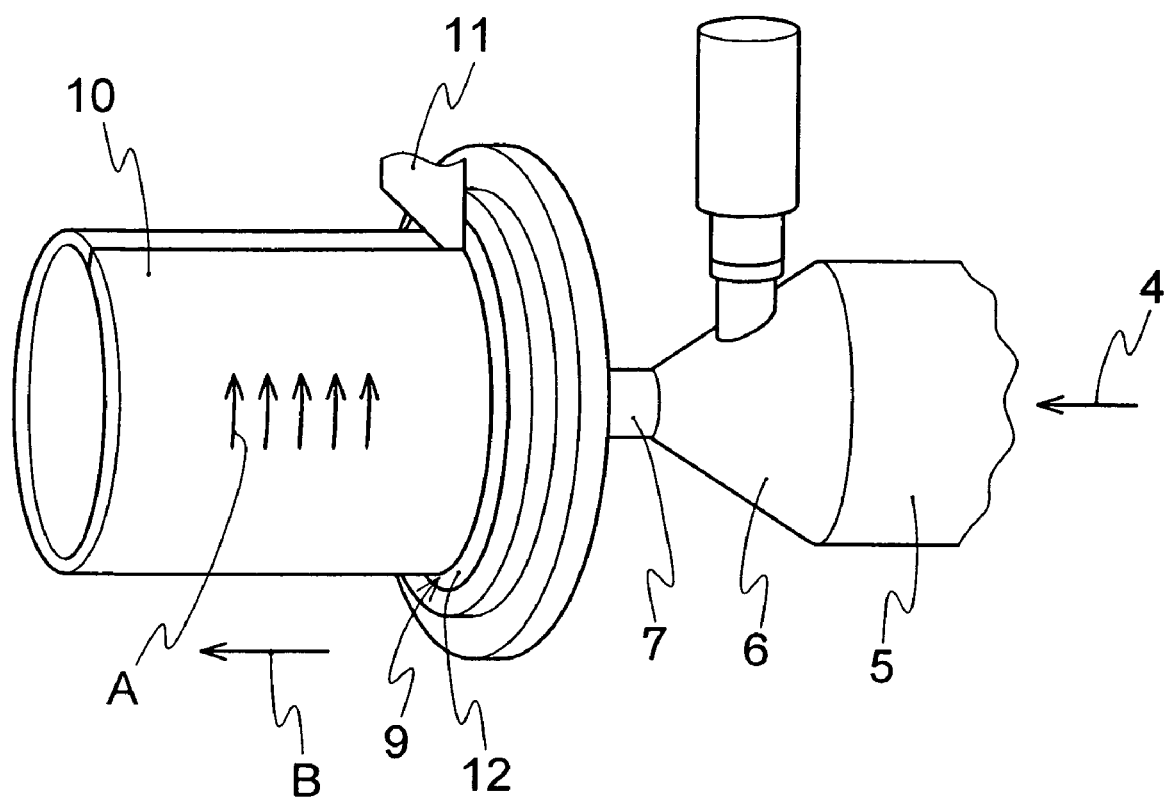
FIG. 2 is an explanatory view showing a method for preparing the tread of the present invention.
Figure 3:
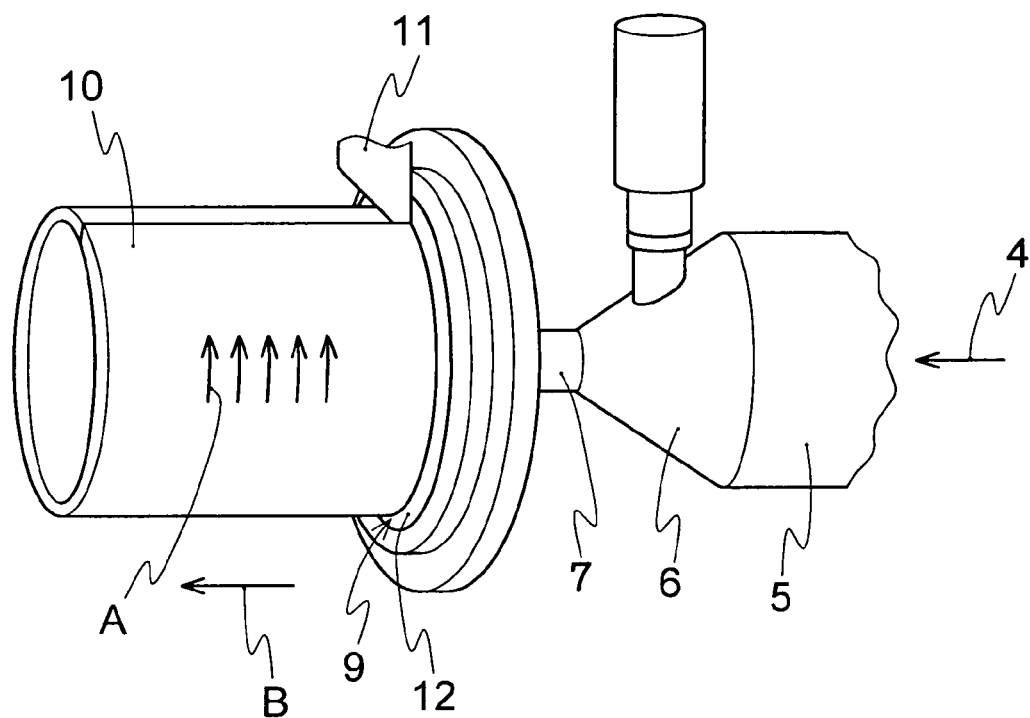
Figure 4:
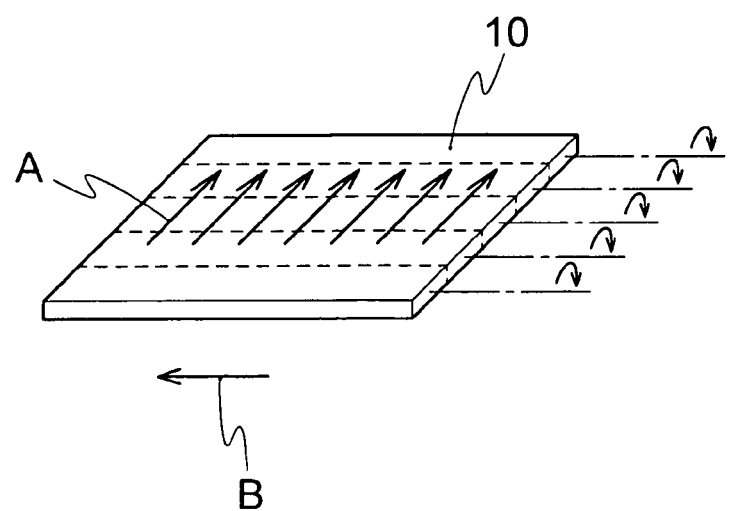

As a method for forming the tread, a conventional extrusion process is employed. When the tread is formed merely by extrusion, the staple fibers are oriented in the circumferential direction of the tread as shown in FIG. 1(a). As shown in FIG. 2, if the rubber composition containing staple fibers is rolled by using a calendar roll, and the obtained sheet is folded, it is possible to prepare a tire in which the staple fibers are oriented in the circumferential direction of the tread as shown in FIG. 1(b).

EXAMPLES

Next, the present invention is explained in more detail based on Examples, but the present invention is not limited thereto.

Raw materials used in Examples and Comparative Examples as well as evaluating method of the obtained tires are collectively shown below.

Natural rubber: RSS#3 grade

High sys polybutadiene: UBEPOL BR150B available from Ube Industries, Ltd.

SBRN9521: Nipol 9521 available from Nippon Zeon Co., Ltd.

SBR1502: SBR1501 available from Sumitomo Chemical Co., Ltd.

N220: SHO BLACK N220 available from Showa Cabot Co., Ltd.

Silica Nipsil VN3: Nipsil VN3 available from Nippon Silica Co., Ltd.

Paraffin oil: Diana process oil available from Idemitsu Kousan Co., Ltd.

Wax: SUN NOC N available from Ohuchi Shinko Kagaku Kogyo Co. Ltd.

Antioxidant: NOCRAC 6C available from Ohuchi Shinko Kagaku Co., Ltd.

Stearic acid: available from NOF CORPORATION

Zinc white: 2 grade of zinc oxide available from Mitsui Mining & Smelting Co., Ltd.

Glass fiber: average fiber diameter of 11 μm, cut length of 3 mm

Carbon fiber: average fiber diameter of 14.5 μm, cut length of 6 mm

Silane coupling agent: Si69 (bis(3-triethoxysilylpropyl)tetrasulfide) available from Degusa Co., Ltd.

Sulfur: Powder sulfur available from Tsurumi Chemical Co., Ltd.

Curing accelerator: NOCCELER CZ available from Ohuchi Shinko Kagaku Kogyo Co. Ltd.

(Average Length of Staple Fibers in Rubber)

After an unvulcanized rubber was dissolved in a solvent such as methyl ethyl ketone, naphtha or hexane, twenty lengths of fibers contained in insoluble residue were measured to define the average value thereof as an average length.

(Complex Elastic Modulus)

Complex elastic modulus was measured by using a viscoelasticity spectro meter made by Iwamoto Seisakusho under the predetermined measuring conditions (at 25° C., measuring frequency of 10 Hz, initial strain of 10%, dynamic strain of 1%).

As a sample, a rubber piece having a thickness of 1.0 mm, a width of 4 mm and a length of 5 mm was cut out from the tire tread portion and used for measurement.

(Braking Performance on Ice)

Tire size: 195/65R15

A Japanese FR vehicle of 2,000 CC was used as a test vehicle. A stopping distance at a speed of 30 km/h on an ice plate was measured, and the braking performance was calculated from the following equation by using Comparative Example 1 as reference.

(Stopping distance in Comparative Example 1)/(stopping distance)×100

The greater the index becomes, the better the braking performance becomes. Before the test was carried out, the vehicle ran in a car for the surface of the tire through 200 km in each case.

(Abrasion Resistance)

Tires having size of 195/65R15 were mounted to a Japanese FF vehicle and the vehicle was allowed to run through 4,000 km. And a depth of groove of each tire tread portion was measured, and a running distance in which depth of the tire groove was reduced to 1 mm was calculated and indexed according to the following formula:

(running distance in which depth of tire groove is reduced to 1 mm)/(running distance in which depth of tire groove in Comparative Example 1 is reduced to 1 mm)×100

The greater the index becomes, the better the abrasion resistance becomes.

(Hardness of Rubber)

Hardness of the rubber was measured at an atmosphere of −10° C. according to JIS A.

Examples 1 to 2 and Comparative Examples 1 to 5

By using rubber compositions shown in Table 1, a tire in which staple fibers were oriented in the circumferential direction of the tread was formed using a conventional extrusion method. And a tire in which staple fibers were oriented in the thickness direction of the tread was also formed using a method shown in FIG. 2. In the method shown in FIG. 2, the tread shown in the drawing was formed by using a rubber composition blended with staple fibers which was rolled by calendar roll into a thickness of 1 mm and a width of 1.5 m, and by repeating folding it.

By using the obtained tire, the evaluations were carried out. The result is shown in Table 1.

method for forming a tire tread shown in FIG. 2 in order to orient the staple fibers in the thickness direction of the tread.

In Comparative Examples 1 to 2 in which staple fibers are not mixed, Comparative Example 3 in which staple fibers are used but the staple fibers are not oriented in the thickness direction of the tread, the complex elastic modulus in the thickness direction of the tire and the complex elastic modulus in the circumferential direction of the tire are out of the range defined in the patent claim, Comparative Example 4 in which the staple fibers are oriented in the thickness direction of the tread but the complex elastic modulus is out of the range defined in the patent claim, and Comparative Example 5 in which the tread hardness at −10° C. is out of the range defined in the patent claim, it can be found that performance on ice and snow road and abrasion resistance are inferior to Examples.

According to the present invention, it is possible to obtain a tire having excellent performance on ice and snow road, which improves or balances adhesion, adhesion friction, digging-up friction, scratching friction and abrasion resistance.

What is claimed is:

1. A studless tire, wherein glass fibers or carbon fibers having an average fiber diameter of 1 to 100 μm and an average length of 0.1 to 5 mm are dispersed in a diene rubber of a tread in an amount of 3 to 20 parts by weight based on 100 parts by weight of the diene rubber in such a way that the glass fibers or carbon fibers are oriented in a thickness direction of the tread, a complex elastic modulus E1 of the tread in the thickness direction of the tread and an elastic modulus E2 of the tread in a circumferential direction of the tire measured at 25° C. satisfy the equation $1.1 \leq E1/E2 \leq 4$, and hardness of the tread rubber measured at −10° C. is 45 to 75 degrees, and

TABLE 1

| Examples | Com. Ex. No. 1 | Com. Ex. No. 2 | Com. Ex. No. 3 | Ex. No. 1 | Ex. No. 2 | Com. Ex. No. 4 | Com. Ex. No. 5 |
|---|---|---|---|---|---|---|---|
| Natural rubber | 60 | 60 | 60 | 60 | 60 | 60 | — |
| High-sys polybutadiene | 40 | 40 | 40 | 40 | 40 | 40 | — |
| SBRN9521 | — | — | — | — | — | — | 73.3 |
| SBR1502 | — | — | — | — | — | — | 53 |
| N220 | 45 | 45 | 45 | 45 | 45 | 45 | 45 |
| Silica Nipsil VN3 | 20 | 20 | 20 | 20 | 20 | 20 | 20 |
| Paraffin oil | 20 | 20 | 25 | 25 | 25 | 40 | — |
| Wax | 2 | 2 | 2 | 2 | 2 | 2 | 2 |
| Antioxidant | 1.5 | 1.5 | 1.5 | 1.5 | 1.5 | 1.5 | 1.5 |
| Stearic acid | 2 | 2 | 2 | 2 | 2 | 2 | 2 |
| Zinc white | 3 | 3 | 3 | 3 | 3 | 3 | 3 |
| Glass fiber | — | — | 5 | 5 | — | 30 | 5 |
| Carbon black | — | — | — | — | 5 | — | — |
| Silane coupling agent | 1.2 | 1.2 | 1.2 | 1.2 | 1.2 | 1.2 | 1.2 |
| Sulfur | 1.5 | 1.5 | 1.5 | 1.5 | 1.5 | 1.5 | 1.5 |
| Curing accelerator | 1 | 1 | 1 | 1 | 1 | 1 | 1 |
| Average length of staple fibers in rubber (mm) | | | 0.5 | 0.5 | 0.5 | 0.5 | 0.5 |
| Method for forming tread | Conventional extrusion | Method of FIG. 2 | Conventional extrusion | Method of FIG. 2 | Method of FIG. 2 | Method of FIG. 2 | Method of FIG. 2 |
| Complex elastic modulus E1 | 4.3 | 4.6 | 4.3 | 6.1 | 6 | 16.6 | 8.5 |
| Complex elastic modulus E2 | 4.5 | 4.4 | 6.0 | 4.3 | 4.1 | 4.0 | 4.0 |
| E1/E2 | 0.96 | 1.05 | 0.72 | 1.42 | 1.46 | 4.15 | 1.7 |
| Braking performance on ice | 100 | 100 | 105 | 125 | 126 | 95 | 75 |
| Abrasion resistance | 100 | — | 90 | 100 | 103 | 92 | 95 |
| Hardness of rubber (−10° C.) | 59 | 60 | 60 | 61 | 62 | 66 | 78 |

Examples 1 to 2 show the test results of the tire, which was obtained using a tire tread by mixing staple fibers defined in the patent claims, and folding and superposing a rubber sheet having a thickness of 1 mm according to the wherein said tread is made by rolling a specified rubber composition by a calendar roll to generate a sheet and repeatedly folding the sheet.

* * * * *